(12) United States Patent
Quadri et al.

(10) Patent No.: US 9,683,722 B2
(45) Date of Patent: Jun. 20, 2017

(54) STAGE LIGHT FIXTURE, IN PARTICULAR STAGE FOLLOW SPOT

(71) Applicant: CLAY PAKY S.P.A., Seriate (IT)

(72) Inventors: Pasquale Quadri, Torre De'Roveri (IT); Angelo Cavenati, Brusaporto (IT)

(73) Assignee: CLAY PAKY S.P.A., Seriate (IT)

(*) Notice: Subject to any disclaimer, the term of this patent is extended or adjusted under 35 U.S.C. 154(b) by 277 days.

(21) Appl. No.: 14/402,604

(22) PCT Filed: Jun. 18, 2013

(86) PCT No.: PCT/IB2013/055011
§ 371 (c)(1),
(2) Date: Nov. 20, 2014

(87) PCT Pub. No.: WO2013/190473
PCT Pub. Date: Dec. 27, 2013

(65) Prior Publication Data
US 2015/0145994 A1    May 28, 2015

(30) Foreign Application Priority Data

Jun. 18, 2012  (IT) .............................. MI2012A1061

(51) Int. Cl.
| | |
|---|---|
| *F21V 14/04* | (2006.01) |
| *F21V 21/30* | (2006.01) |
| *F21V 5/04* | (2006.01) |
| *F21V 13/04* | (2006.01) |
| *H04N 5/225* | (2006.01) |
| *H04N 5/235* | (2006.01) |
| *H04N 7/18* | (2006.01) |
| *F21W 131/406* | (2006.01) |

(52) U.S. Cl.
CPC ................ *F21V 14/04* (2013.01); *F21V 5/04* (2013.01); *F21V 13/04* (2013.01); *F21V 21/30* (2013.01); *H04N 5/2254* (2013.01); *H04N 5/2354* (2013.01); *H04N 7/18* (2013.01); *F21W 2131/406* (2013.01)

(58) Field of Classification Search
CPC . F21V 14/04; F21V 5/04; F21V 13/04; F21V 21/30; F21V 14/045; H04N 5/2254; H04N 5/2354; H04N 7/18; F21W 2131/406; F21S 10/06
See application file for complete search history.

(56) References Cited

U.S. PATENT DOCUMENTS 4,663,698 A * 5/1987 Tomlinson ............... F21S 10/06
                                                  359/857
4,827,387 A * 5/1989 Ferren ..................... F21V 21/30
                                                  362/277

(Continued)

FOREIGN PATENT DOCUMENTS

EP    0 226 428    6/1987
EP    0 564 828    10/1993

(Continued)

*Primary Examiner* — Bao Q Truong
(74) *Attorney, Agent, or Firm* — Leason Ellis LLP

(57) ABSTRACT

A stage light fixture is provided with a light source adapted to emit a light beam; with a main body where the light source is arranged; and with a head articulated with respect to the main body and configured to selectively deflect the light beam coming out from the main body.

17 Claims, 2 Drawing Sheets

(56) References Cited

U.S. PATENT DOCUMENTS

| | | | | |
|---|---|---|---|---|
| 6,160,582 | A * | 12/2000 | Hill | H05B 37/02 348/370 |
| 6,764,198 | B2 * | 7/2004 | Chang | F21S 10/06 362/269 |
| 7,465,067 | B2 * | 12/2008 | Maes | F21S 10/06 362/275 |
| 2003/0137842 | A1 | 7/2003 | Chang | |
| 2011/0098858 | A1 | 4/2011 | Yourlo et al. | |
| 2011/0149575 | A1 | 6/2011 | Quadri | |

FOREIGN PATENT DOCUMENTS

| | | |
|---|---|---|
| FR | 2666421 | 3/1992 |
| JP | 4974786 | 10/1972 |
| JP | 04160702 | 6/1992 |
| JP | 09050889 | 2/1997 |
| JP | 20073733442 | 10/2007 |
| JP | 2008269906 | 11/2008 |
| JP | 2011158860 | 8/2011 |
| WO | WO 99/41544 | 8/1999 |
| WO | WO 2011/098858 | 8/2011 |

* cited by examiner

STAGE LIGHT FIXTURE, IN PARTICULAR STAGE FOLLOW SPOT

CROSS REFERENCE TO RELATED APPLICATIONS

The present application is a U.S. National Phase of International Patent Application PCT/IB2013/055011, filed Jun. 18, 2013, which claims priority to Italian Patent Application No. MI2012A001061 filed Jun. 18, 2012, each of which is incorporated herein by reference in its entirety.

TECHNICAL FIELD

The present invention relates to a stage light fixture, and in particular to a stage follow spot.

BACKGROUND ART

Follow spots are stage light fixtures often used in the field of performance and are commonly referred to as "spotlights". Follow spots generally project a focused and well-defined light beam and are constantly manoeuvred by an operator to "follow" the movements of an actor, singer, dancer on the stage. Follow spots are generally located in the part of the theatre opposite to the stage, on side catwalks of stages in large theatres, or on metal structures above stages for large musical events or stadiums.

Known follow spots are normally provided with a main body, which extends along a longitudinal axis and contains the light source and a plurality of processing elements, adapted to process the light beam projected.

The main body is rotatably supported by a trestle and is manually moved by the operator.

However, known follow spots are characterized by difficult manoeuvrability due to large volumes and the increased weight of the main body to be moved. The main body of follow spots of the known art is generally longer than 1.5 metres long and weighs from 50 to 120 kg. Therefore, in theatres, the manoeuvring space intended for follow spots of known type is quite large and moving the main body is often difficult.

Moreover, stage light fixtures of this type are provided with an external supply unit, which is normally located close to the trestle and is connected to the main body by means of cables. Such a unit weighs approximately 30 kg.

Due to the above-mentioned weights and volumes, the operations of assembling and disassembling each stage light fixture of the known art requires the presence of at least two operators.

DISCLOSURE OF INVENTION

It is one object of the present invention to provide a stage light fixture which is not very cumbersome, is lightweight and manoeuvrable while being easy and cost-effective to be implemented.

In accordance with such objects, the present invention relates to a stage light fixture comprising a light source adapted to emit a light beam; a main body where the light source is arranged; and a head articulated with respect to the main body and configured to selectively deflect the light beam coming out from the main body.

Thereby, in order to direct the light beam, it is sufficient to move the head without moving the main body, which is the most cumbersome part of the stage light fixture. This makes the stage light fixture very manoeuvrable. The manoeuvring space required for the stage light fixture according to the present invention is indeed reduced with respect to the manoeuvring space of traditional stage light fixtures. The manoeuvring space for the stage light fixture according to the present invention is that required for moving the head alone and not for moving the entire main body.

Moreover, the head of the stage light fixture according to the present invention weighs less than the main body of known stage light fixtures considering that it does not house the light source. This facilitates both manual and automated operations for moving the head.

According to a preferred embodiment of the present invention, the head comprises an objective lens having a first optic axis and a beam deflecting device configured to deflect the light beam coming out from the main body and to align it with the first optic axis of the objective lens. Thereby, the light beam coming out from the main body is deflected by the beam deflecting device and optimized by the final objective lens. The movement of the articulated head determines the projection of the beam in a plurality of directions.

According to a preferred embodiment of the present invention, the beam deflecting device is coupled to a mechanism configured to move the beam deflecting device on the basis of the movement of the head so as to avoid deformations of the light beam coming out from the head. Thereby, the mechanism compensates for the movements of the head thus avoiding deformations of the beam coming out from the head.

According to a preferred embodiment of the present invention, the head is rotatable about a first and a second axis that are orthogonal to each other. Thereby, the beam coming out from the head can be directed substantially in all directions.

According to a preferred embodiment of the present invention, the head is provided with a driving handlebar, configured to move the head on the basis of the movement imparted to the driving handlebar. Thereby, the operator may direct the light beam by simply moving the articulated head.

According to a preferred embodiment of the present invention, the stage light fixture comprises a video camera for filming a scene that is to be lit up by the light beam and a screen capable of displaying the scene filmed by the video camera; preferably the video camera is an infrared video camera. Thereby, the operator can see the object/actor to be lit up in the scene and projects the light beam directly on the actor even when the scene is completely in the dark.

According to a preferred embodiment of the stage light fixture according to the present invention, the main body extends along a longitudinal axis and the light source is arranged laterally to the longitudinal axis. Thereby, the axial volume of the main body is minimized.

According to a preferred embodiment of the present invention, the longitudinal axis of the main body is, in use, arranged substantially vertical. Thereby, the stage light fixture according to the present invention takes on a substantially "telescopic" configuration and mostly extends in the vertical direction, thus reducing the manoeuvring spaces and optimizing the manoeuvrability of the stage light fixture. The axial volumes of the main body are reduced due to the lateral arrangement of the light source and therefore the articulated head is arranged at such a height as to be easily manoeuvred by both a standing operator and an operator sitting on a stool.

According to a preferred embodiment of the stage light fixture according to the present invention, the main body is provided with at least two wheels for moving the main body.

Thereby, the main body may be moved without the aid of transport trolleys or lifting means.

According to a preferred embodiment of the stage light fixture according to the present invention, the stage light fixture comprises a supply unit housed within the main body. Thereby, the supply unit is integrated within the main body of the stage light fixture and there are no cables outside the main body, with the exception of the power supply cable alone. This avoids the presence of many cables in the manoeuvring zone of the stage light fixture which may hinder the operators and especially avoids operators from performing operations of transporting and storing the supply unit and cables, and operations of connecting the cables at each new assembly.

BRIEF DESCRIPTION OF THE DRAWINGS

Further features and advantages of the present invention will become more apparent from the following description of a non-limiting embodiment thereof, with reference to the figures of the accompanying drawings, in which.

BEST MODE FOR CARRYING OUT THE INVENTION

Figure 1:
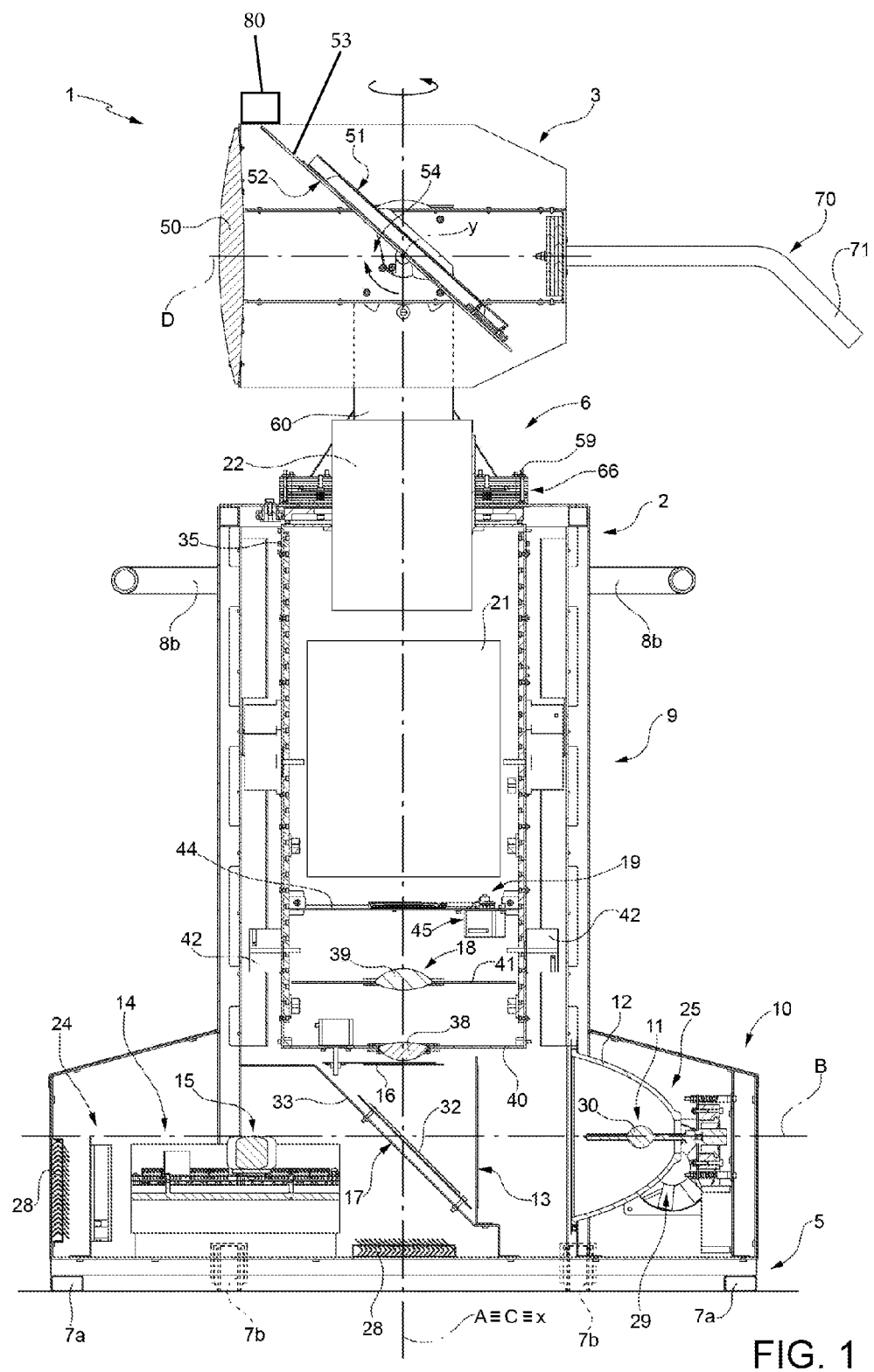
FIG. 1 is a diagrammatic side view, with sectional parts and parts removed for clarity, of the stage light fixture according to the present invention.

Reference numeral 1 in FIG. 1 indicates a stage light fixture.

The stage light fixture 1 in the non-limiting embodiment here described and illustrated is a follow spot, commonly referred to as a "spotlight".

The stage light fixture 1 comprises a main body 2 and a head 3, which is articulated with respect to the main body 2.

The main body 2 substantially extends along a longitudinal axis (A). In use, the longitudinal axis A is preferably vertical.

The main body 2 comprises a first end 5, adapted to be arranged resting on a supporting surface and a second end 6, opposite to the first end 5, to which head 3 is coupled.

In the non-limiting case here illustrated, the first end 5 is provided with a plurality of feet 7a and with at least two wheels 7b aligned and arranged along the same side of the main body 2 (shown in FIG. 1).

Figure 2:
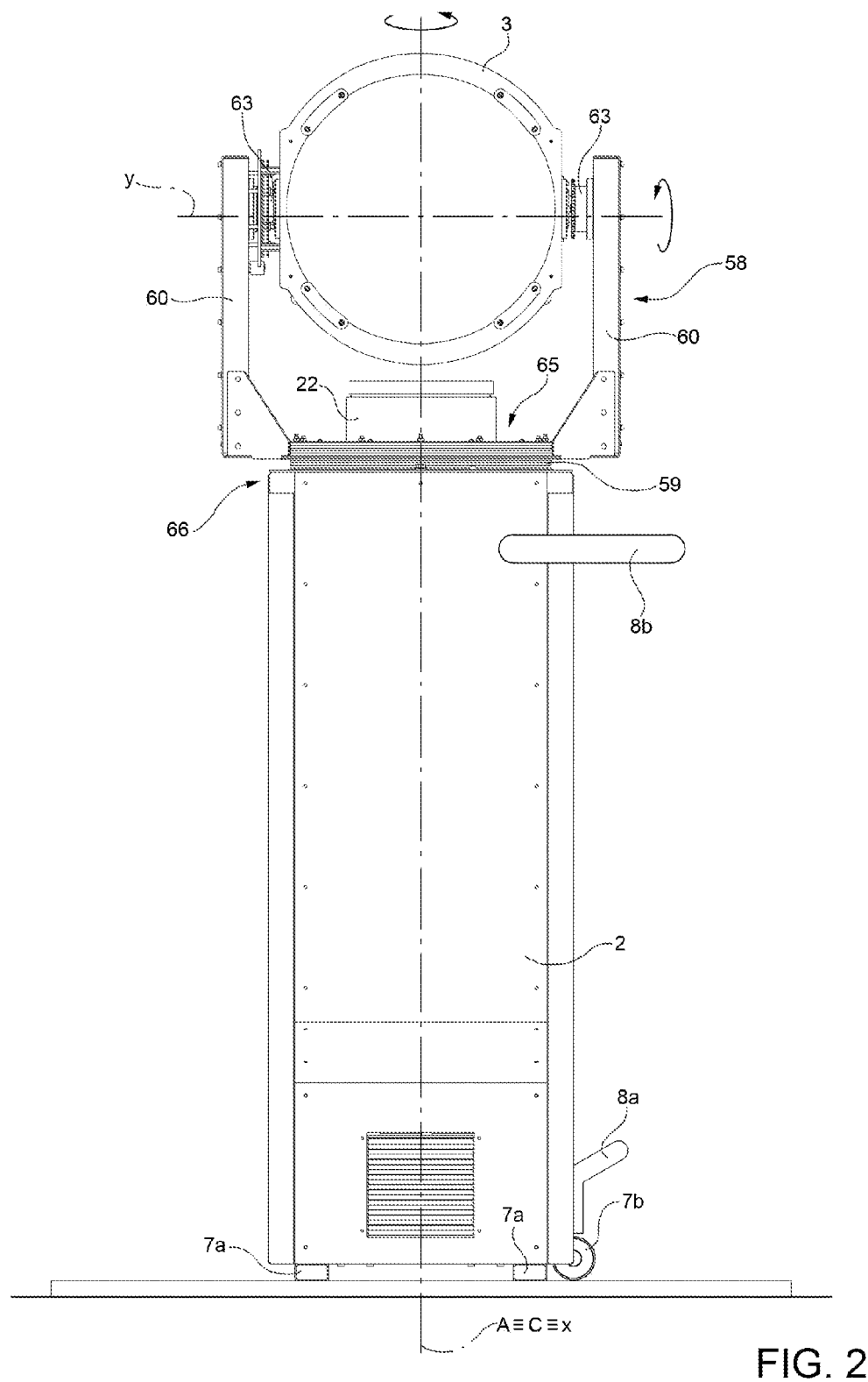
FIG. 2 is a diagrammatic front view, with sectional parts and parts removed for clarity, of the stage light fixture according to the present invention.

In the non-limiting embodiment here described and illustrated, the main body 2 is also provided with a resting bar 8a and with a handle 8b (FIG. 2). With reference to FIG. 2, the resting bar 8a extends from the main body 2 along the same side on which wheels 7b are arranged and substantially close to wheels 7b. Handle 8b extends from the main body 2 and is arranged above the resting bar 8a, substantially at a height adequate to allow the operator to grasp handle 8b by hand. In order to move the stage light fixture 1, the operator places at least one foot on the resting bar 8a, grasps handle 8b and pulls handle 8b towards him/herself so as to tilt the stage light fixture 1 and load the weight of the stage light fixture 1 on the wheels 7b alone.

A variant (not shown) includes the main body 2 to be provided with auxiliary feet which can be extracted when needed to stabilize the positioning of the stage light fixture.

The main body 2 is substantially hollow and comprises a preferably cylindrical, elongated portion 9 and a base 10, which extends laterally with respect to the elongated portion 9.

The elongated portion 9 and base 10 define respective internal areas that communicate with each other.

The main body 2 houses therein a light source 11, a reflector 12 associated with the light source 11, a heat-resistant assembly 13, a supply unit 14, a control unit 15, a beam deflecting device 17, a shutter 16, a first optic assembly 18, a diaphragm 19, a light beam processing assembly 21 and a zoom assembly 22.

Light source 11, reflector 12, heat-resistant assembly 13, supply unit 14, control unit 15 and beam deflecting device 17 are preferably housed in base 10, while the remaining components are housed in the elongated portion 9 of the main body 2.

In particular, the supply unit 14 and the control unit 15 are arranged in a first side portion 24 of base 10, while the light source 11 and the reflector 12 are arranged in a second side portion 25 of base 10 opposite to the first side portion 24.

The beam deflecting device 17 is substantially arranged in a middle portion 26 of base 10.

At the first side portion 24, base 10 is preferably provided with at least one air intake 28 for cooling the supply unit 14, while at the second side portion 25, base 10 is provided with at least one cooling device 29 comprising at least one air intake and a fan (not shown in the accompanying figures) for cooling the light source 11.

Base 9 is preferably provided with a door (not shown) for accessing the side portion 25 so as to possibly intervene on the light source 11 in a simple and quick manner.

The light source 11 is adapted to emit a light beam substantially along an optic axis B.

In the non-limiting embodiment here described and illustrated, the light source 11 is a discharge lamp comprising a bulb 30, generally made of glass or quartz, containing halides.

In the non-limiting embodiment here described and illustrated, reflector 12 is preferably substantially semi-elliptical in shape.

The position of the light source 11 with respect to reflector 12 can preferably be adjusted, e.g. manually.

The heat-resistant assembly 13 is substantially configured to generate a thermal barrier between the zone where the light source 11 is housed and the zone downstream of the heat-resistant assembly 13.

The beam deflecting device 17 is preferably a mirror 32, oriented so as to intercept the light beam generated by the light source 11 and to direct it in the elongated portion 9 of the main body 2 along a second optic axis C.

In the non-limiting embodiment here described and illustrated, mirror 32 is arranged at 45° with respect to the optic axis B, so as to substantially determine a 90° deflection of the light beam. The light beam downstream of mirror 32 indeed extends along the second optic axis C, preferably orthogonal to the optic axis B.

In the non-limiting embodiment here described and illustrated, the optic axis C coincides with the longitudinal axis A of the main body 2.

Preferably, mirror 32 is a cold mirror which reflects visible light and is transparent to infrared rays and is supported by a supporting frame 33 fixed to a wall of the main body 2.

The inclination of the supporting frame 33 can be adjusted so as to ensure that the light beam generated by the light source 11 along axis B is deflected by mirror 32 so as to be aligned with the second optic axis C.

The control unit 15 is preferably in communication with a remote control unit (not shown in the accompanying figures) by means of control signals, preferably transmitted with DMX protocol.

The elongated portion 9 is provided with a supporting structure 35, which supports, in this order, the shutter 16, the first optic assembly 18, the diaphragm 19, the light beam processing assembly 21 and the zoom assembly 22.

Shutter 16 is defined by a movable element, which selectively intercepts the light beam to prevent the light beam from passing and to determine the temporary blackout of the light beam.

The first optic assembly 18 is configured to process the light beam before it affects diaphragm 19. In particular, the first optic assembly 18 is configured to selectively change the size of the light beam before it affects diaphragm 19, so as to change the characteristics of the light beam which crosses the hole of diaphragm 19 depending on the needs of the scene. In particular, the first optic assembly 18 is capable of varying the concentration uniformity of the light beam.

The change degree of the dimensions of the light beam by the first optic assembly 18 is adjusted by a control (not illustrated in the accompanying figures), which may be manually controlled by an operator or automatically controlled by the control unit 15 on the basis of the needs of the scene. For example, the first optic assembly 18 may be adjusted to change the dimensions of the light beam on the basis of the distance between the stage light fixture 1 and the object to be lit up.

In the non-limiting embodiment here described and illustrated, the first optic assembly 18 comprises a first lens 38 arranged close to mirror 32, and a second lens 39 arranged between the first lens 38 and diaphragm 19.

The first lens 38 is fixed and is preferably supported by a plate 40 fixed to the supporting structure 35, while the second lens 39 is preferably movable along the optic axis C.

In particular, the second lens 39 is coupled to a carriage 41, which is movable along the optic axis C.

In the non-limiting case here illustrated, carriage 41 is moved by means of two electric motors 42 with belt transmission and supported by the supporting structure 35.

A variant of the present invention (not shown) includes carriage 41 being moved by one or more electric motors with worm screw supported by carriage 41.

In the non-limiting case here illustrated, the first lens 38 and the second lens 39 are biconvex lenses.

Diaphragm 19 is preferably an iris diaphragm and defines a hole (not clearly shown in the accompanying figures) crossed, in use, by the light beam. The dimensions of the hole are variable and define the so-called "aperture of the diaphragm". Diaphragm 19 is supported by a supporting plate 44 and is provided with adjustment means 45 configured to adjust the aperture of diaphragm 19. In other words, the adjustment means 45 adjust the diameter of the hole of diaphragm 19.

The light beam processing assembly 21 is configured to change the shape and/or colour of the light beam projected by the stage light fixture 1.

In the embodiment here described, the light beam processing assembly 21 comprises a plurality of elements in sequence (not shown for simplicity), such as for example an optic assembly for focusing the light beam, at least one gobo assembly, at least one colour assembly configured to change the colour of the light beam projected, at least one shaper of the light beam, and one frost assembly configured to diffuse the incoming light beam.

The zoom assembly 22 is configured to selectively enlarge the light beam which crosses it.

In the non-limiting embodiment here described, the zoom assembly 22 could be a zoom assembly of the type described in application MI2009A000914 filed by the same applicant for the present application. It is understood that the zoom assembly 22 may be any zoom assembly capable of selectively enlarging the incoming light beam.

Head 3 is substantially hollow and is coupled to the main body 2 so that the area inside head 3 is in communication with the area inside the elongated portion 9 of the main body 2. Thereby, the light beam coming out from the main body 2 enters the area inside head 3.

Head 3 comprises an objective lens 50 provided with an optic axis D and a beam deflecting device 51, which is configured to deflect the light beam coming out from the main body 2 and to align it with the optic axis D of the objective lens 50.

In the non-limiting embodiment here described and illustrated, the beam deflecting device 51 is preferably a mirror 52, oriented so as to intercept the light beam coming out from the main body 2. Mirror 52 is preferably supported by a supporting frame 53.

Mirror 52 is preferably coupled to a mechanism 54 configured to move mirror 52 so as to compensate for the movement of head 3 and avoid deformations of the beam coming out from head 3. In particular, mechanism 54 determines a movement of mirror 52 in a direction opposite to the direction of movement of head 3. In the non-limiting embodiment here described and illustrated, each movement of head 3 corresponds to a movement of the mirror in the opposite direction, with a transmission ratio of preferably 2:1.

As already mentioned above, head 3 is articulated with respect to the main body 2.

In particular, head 3 can rotate about a first axis X and a second axis Y, that are orthogonal to each other, and referred to as PAN and TILT, respectively.

In the non-limiting embodiment here described and illustrated, axis X (of PAN) coincides with the longitudinal axis A of the main body 2.

With reference to FIG. 2, head 3 is laterally supported by a fork 58, which is provided with a plate 59 and with two arms 60, integrally coupled to plate 59.

Head 3 is rotatably coupled to each arm 60. In particular, head 3 is provided with two rotation pins 63, which protrude from sides opposite to head 3 and extend along axis Y. The pins 63 cooperate, in use, with the respective movement devices (not shown in the accompanying figures) housed in the arms 60 to cause head 3 to rotate about axis Y. In the non-limiting embodiment here described, the movement devices comprise motorized belt gears (not shown in the accompanying figures) which can be controlled by the control unit 15.

The movement devices are preferably provided with a clutch system for more accurately controlling the movements of head 3 about axis Y, especially during manual movement.

Plate 59 is rotatably coupled to the end 6 of the main body 2 and is provided with a hole 65 for allowing the passage of the light beam coming out from the main body 2.

Plate 59 can rotate about axis X due to a motorized coupling system 66 which can be controlled by the control unit 15. The rotation of plate 59 about axis X determines the rotation of the arms 60 and the subsequent rotation of head 3 about axis X.

A variant (not shown) provides that the coupling system 66 not is motorized and may only be activated manually.

Head 3 is preferably provided with a driving handlebar 70 (shown only in FIG. 1), configured to move head 3 on the basis of a movement imparted to the driving handlebar 70 by an operator.

The driving handlebar 70 is provided with two gripping bars 71 which protrude in diverging directions from head 3.

In use, head 3 is moved about the axes X and Y under the direct control of an operator by means of the driving handlebar 70 or automatically under the control of the control unit 15 or with remote control.

A variant of the present invention includes head 3 being provided with a video camera 80, preferably an infrared video camera 80 for filming the scene that is to be lit up by the light beam, and with a screen for displaying images acquired by the video camera 80. The control unit 15 is in communication with the video camera 80 and with the screen, and is configured to determine a position of a projection of the light beam with respect to the scene filmed by the video camera 80, and to display an indicator corresponding to such a position on the screen. Thereby, the operator can aim at the object to be lit up (generally an actor in a scene) even in the dark.

It is finally apparent that modifications and variants may be made to the stage light fixture here described without departing from the scope of the appended claims.

The invention claimed is:

1. Stage light fixture (1) comprising:
a light source (11) adapted to emit a light beam;
a main body (2), inside which is arranged the light source (11); and
a head (3) articulated with respect to the main body (2) and configured to selectively deflect the light beam coming out from the main body (2);
wherein the head comprises an objective lens having a first optic axis;
wherein the head comprises a beam deflecting device configured to deflect the light beam coming out from the main body and to align the light beam with the first optic axis of the objective lens;
wherein the beam deflecting device is coupled to a mechanism configured to move the beam deflecting device on the basis of the movement of the head so as to avoid deformations of the light beam coming out from the head.

2. Stage light fixture according to claim 1, wherein the head (3) is rotatable about a first axis (X) and a second axis (Y) that are orthogonal to one another.

3. Stage light fixture according to claim 1, wherein the head (3) is provided with a driving handlebar (70), configured to move the head (3) on the basis of the movement imparted to the driving handlebar (70).

4. Stage light fixture according to claim 1, comprising a control device (15) configured to regulate the position of the head (3) with respect to the main body (2).

5. Stage light fixture according to claim 4, wherein the control device (15) is configured to receive controlling signals from a remote driving station.

6. Stage light fixture according to claim 4, comprising a video camera for filming a scene that is to be lit up by the light beam.

7. Stage light fixture according to claim 6, wherein the video camera is an infrared video camera.

8. Stage light fixture according to claim 6, comprising a screen for displaying images acquired by the video camera.

9. Stage light fixture according to claim 6, wherein the control device (15) is in communication with the video camera and is configured to determine a position of a projection of the light beam with respect to the scene filmed by the video camera.

10. Stage light fixture according to claim 9, wherein the control device (15) is in communication with the screen and is configured to display an indicator corresponding to the position of the projection of the light beam.

11. Stage light fixture according to claim 1, wherein the main body (2) extends along a longitudinal axis (A); the light source (11) being arranged laterally with respect to the longitudinal axis (A).

12. Stage light fixture according to claim 11, wherein the longitudinal axis (A) of the main body (2) is, in use, arranged substantially vertical.

13. Stage light fixture according to claim 1, wherein the main body (2) is provided with at least two wheels (7a).

14. Stage light fixture according to claim 1, comprising a supply unit (14); the supply unit (14) being housed inside the main body (2).

15. Stage light fixture according to claim 1, wherein the main body (2) comprises one or more light beam processing elements (16, 18, 19, 21, 22).

16. Stage light fixture according to claim 15, wherein the light beam processing elements (16, 18, 19, 21, 22) comprise a diaphragm (19) and a first optic assembly (18), arranged between the light source (11) and the diaphragm (19) and configured to change the light beam dimensions.

17. Stage light fixture according to claim 1, wherein the stage light fixture (1) is a follow spot.

* * * * *